(12) United States Patent
Pan et al.

(10) Patent No.: US 11,990,645 B2
(45) Date of Patent: May 21, 2024

(54) BATTERY ASSEMBLY, BATTERY PACK, AND VEHICLE

(71) Applicant: CALB Co., Ltd., Jiangsu (CN)

(72) Inventors: Fangfang Pan, Changzhou (CN); Junshan Guan, Luoyang (CN); Yawei Wang, Changzhou (CN); Tinglu Yan, Changzhou (CN); Yongjie Zhang, Luoyang (CN); Qixin Guo, Luoyang (CN)

(73) Assignee: CALB Co., Ltd., Jiangsu (CN)

( * ) Notice: Subject to any disclaimer, the term of this patent is extended or adjusted under 35 U.S.C. 154(b) by 179 days.

(21) Appl. No.: 17/391,040

(22) Filed: Aug. 2, 2021

(65) Prior Publication Data

US 2022/0367976 A1    Nov. 17, 2022

(30) Foreign Application Priority Data

May 14, 2021 (CN) .......................... 202110526807.9

(51) Int. Cl.
*H01M 50/502* (2021.01)
*H01M 10/42* (2006.01)
(Continued)

(52) U.S. Cl.
CPC ....... *H01M 50/502* (2021.01); *H01M 10/425* (2013.01); *H01M 50/204* (2021.01);
(Continued)

(58) Field of Classification Search
CPC ............ H01M 50/502; H01M 50/204; H01M 50/531; H01M 50/55; H01M 50/533;
(Continued)

(56) References Cited

U.S. PATENT DOCUMENTS

2008/0113262 A1*  5/2008  Phillips ............... H01M 10/482
                                                              429/149
2014/0077605 A1   3/2014  Bulur et al.
(Continued)

FOREIGN PATENT DOCUMENTS

| CN | 111965561 | | 11/2020 | |
| CN | 112201768 A | * | 1/2021 | ........ H01M 10/0525 |
| WO | WO-2021149774 A1 | * | 7/2021 | ......... G01R 31/3648 |

OTHER PUBLICATIONS

English translation of Dong et al. (CN-112201768-A). (Year: 2021).*
(Continued)

*Primary Examiner* — Haroon S. Sheikh
*Assistant Examiner* — Drew C Newman
(74) *Attorney, Agent, or Firm* — JCIP GLOBAL INC.

(57) ABSTRACT

A battery assembly, a battery pack, and a vehicle are provided. The battery assembly includes a battery column and a voltage collection assembly disposed on one side of the battery column. The battery column includes at least one first battery, including first and second electrodes. A distance between the first electrode and the voltage collection assembly is greater than a distance between the second electrode and the voltage collection assembly. The first electrode is electrically connected to a case of the first battery, such that a potential of the first electrode is equal to a potential of the case. The voltage collection assembly includes first and second collection terminals. The first collection terminal is connected to the case and configured to collect the potential of the first electrode. The second collection terminal is connected to the second electrode and configured to collect a potential of the second electrode.

18 Claims, 14 Drawing Sheets

(51) Int. Cl.
*H01M 50/204* (2021.01)
*H01M 50/531* (2021.01)
*H01M 50/543* (2021.01)

(52) U.S. Cl.
CPC ....... *H01M 50/531* (2021.01); *H01M 50/543* (2021.01); *H01M 2200/103* (2013.01); *H01M 2220/20* (2013.01)

(58) Field of Classification Search
CPC ............. H01M 50/103; H01M 50/209; H01M 50/569; H01M 10/425; H01M 10/647; H01M 10/48; H01M 10/452; H01M 2010/4271
See application file for complete search history.

(56) References Cited

U.S. PATENT DOCUMENTS

2020/0395590 A1    12/2020  Yasuda et al.
2022/0373602 A1*  11/2022  Kitagawa ........... G01R 31/3648

OTHER PUBLICATIONS

"Search Report of Europe Counterpart Application", issued on Jan. 21, 2022, p. 1-p. 7.

* cited by examiner

BATTERY ASSEMBLY, BATTERY PACK, AND VEHICLE

CROSS-REFERENCE TO RELATED APPLICATION

This application claims the priority benefit of China application no. 202110526807.9, filed on May 14, 2021. The entirety of the above-mentioned patent application is hereby incorporated by reference herein and made a part of this specification.

BACKGROUND

Technical Field

The disclosure relates to battery technology. In particular, the disclosure relates to a battery assembly, a battery pack, and a vehicle.

Description of Related Art

In recent years, as the country vigorously promotes the development of new energy vehicles, which greatly drives the development of power batteries. As demands continuously increase, higher requirements for energy density of battery packs arise.

Currently, a flexible printed circuit (FPC) is adopted for voltage collection on a battery module. The FPC is typically arranged between an upper surface of a plurality of batteries and an upper cover of the battery module, and voltage is collected across two sides of the entire battery module, which may cause inconvenience in the voltage collection.

The above-mentioned information disclosed in the background section only serves to enhance the understanding of the background of the disclosure, and therefore may include information that does not constitute the related art known to those of ordinary skill in the art.

SUMMARY

The purpose of the disclosure is to provide a battery assembly, a battery pack, and a vehicle.

According to a first aspect of the disclosure, a battery assembly includes a battery column and a voltage collection assembly disposed on one side of the battery column. The battery column includes at least one first battery. The first battery includes a first electrode and a second electrode. A distance between the first electrode and the voltage collection assembly is greater than a distance between the second electrode and the voltage collection assembly. The first electrode of the first battery is electrically connected to a case of the first battery, such that a potential of the first electrode is equal to a potential of the case of the first battery. The voltage collection assembly includes a first collection terminal and a second collection terminal. The first collection terminal is connected to the case of the first battery, and is configured to collect the potential of the first electrode through the case of the first battery. The second collection terminal is connected to the second electrode, and is configured to collect a potential of the second electrode.

According to a second aspect of the disclosure, a battery pack includes the battery assembly as described in the first aspect.

According to a third aspect of the disclosure, a vehicle includes the battery pack as described in the second aspect.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

Figure 1:
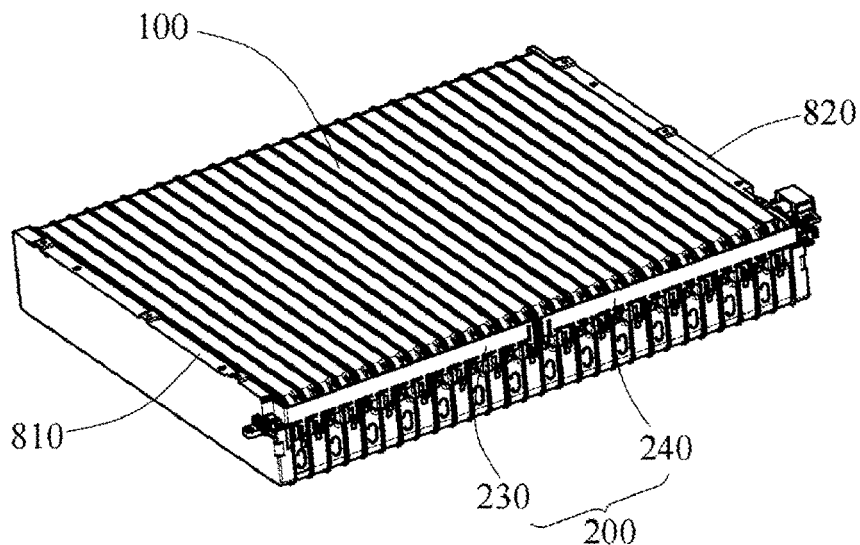
FIG. 1 is a schematic structural diagram of a battery assembly according to an exemplary embodiment of the disclosure.
Figure 2:
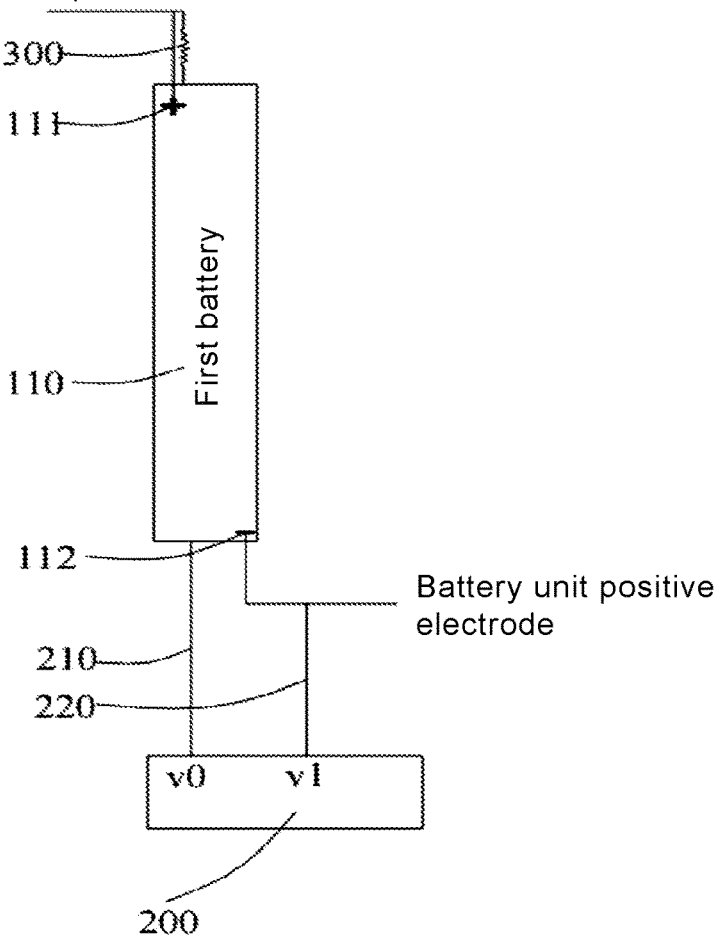
FIG. 2 is a schematic diagram of voltage collection of the battery assembly according to an exemplary embodiment of the disclosure.

As shown in FIG. 1 and FIG. 2, according to an embodiment of the disclosure, a battery assembly includes a battery column 100 and a voltage collection assembly 200 disposed on one side of the battery column 100. The battery column 100 includes at least one first battery 110. The first battery 110 includes a first electrode 111 and a second electrode 112. The distance between the first electrode 111 and the voltage collection assembly 200 is greater than the distance between the second electrode 112 and the voltage collection assembly 200. The first electrode 111 of the first battery 110 is electrically connected to a case of the first battery 110, such that a potential of the first electrode 111 is equal to a potential of the case of the first battery 110. The voltage collection assembly 200 includes a first collection terminal 210 and a second collection terminal 220. The first collection terminal 210 is connected to the case of the first battery 110, and is configured to collect the potential of the first electrode 111 through the case of the first battery 110. The second collection terminal 220 is connected to the second electrode 112, and is configured to collect a potential of the second electrode 112.

According to the embodiment of the disclosure, the battery assembly includes the battery column 100 and the voltage collection assembly 200 disposed on one side of the battery column 100. The battery column 100 includes at least one first battery 110. The distance between the first electrode 111 of the first battery 110 and the voltage collection assembly 200 is greater than the distance between the second electrode 112 of the first battery 110 and the voltage collection assembly 200. In this embodiment of the disclosure, the first electrode 111 of the first battery 110 is connected to the case of the first battery 110, such that the potential of the case of the first battery 110 is equal to the potential of the first electrode 111 of the battery. Based on the above, the voltage collection assembly 200 directly collects the potential of the first electrode 111 through the case, and collects the potential of the electrode on the other side without crossing the entire battery column 100. The battery assembly effectively reduces the difficulty in collection by the voltage collection assembly 200 and facilitates voltage collection.

Hereinafter, each component of the battery assembly according to the embodiment of the disclosure will be described in detail with the accompanying drawings.

As shown in FIG. 2, the battery assembly includes the battery column 100 and the voltage collection assembly 200 disposed on one side of the battery column 100. The battery column 100 includes at least one first battery 110. The first battery 110 may be an aluminum case battery, an iron case battery, or a copper case battery. The first battery 110 includes the first electrode 111 and the second electrode 112. The distance between the first electrode 111 and the voltage collection assembly 200 is greater than the distance between the second electrode 112 and the voltage collection assembly 200. The first electrode 111 of the first battery 110 is electrically connected to the case of the first battery 110, such that the potential of the first electrode 111 is equal to the potential of the case of the first battery 110. For one first battery 110, one of the first electrode 111 and the second electrode 112 is a positive electrode and the other is a negative electrode. Notably in the disclosure, electrical connection refers to a connection form in which various devices/elements are connected through wires or metal conductors to realize circuit conduction between the devices/elements. The first electrode 111 of the first battery 110 is electrically connected to the case of the first battery 110. That is, the first electrode 111 and the case are connected through a metal conductor, such that the potential of the first electrode 111 is equal to the potential of the case.

As shown in FIG. 2, in some embodiments, the battery column 100 contains the first battery 110. In FIG. 2, the first collection terminal 210 of the voltage collection assembly 200 is connected to the case of the first battery 110, and is configured to collect the potential of the first electrode 111. The specific collected potential is v0. The second collection terminal 220 of the voltage collection assembly 200 is connected to the second electrode 112 of the first battery 110, and is configured to collect the potential of the second electrode 112. The specific collected potential is v1. Accordingly, the voltage of the first battery 110 is v0-v1.

Figure 3:
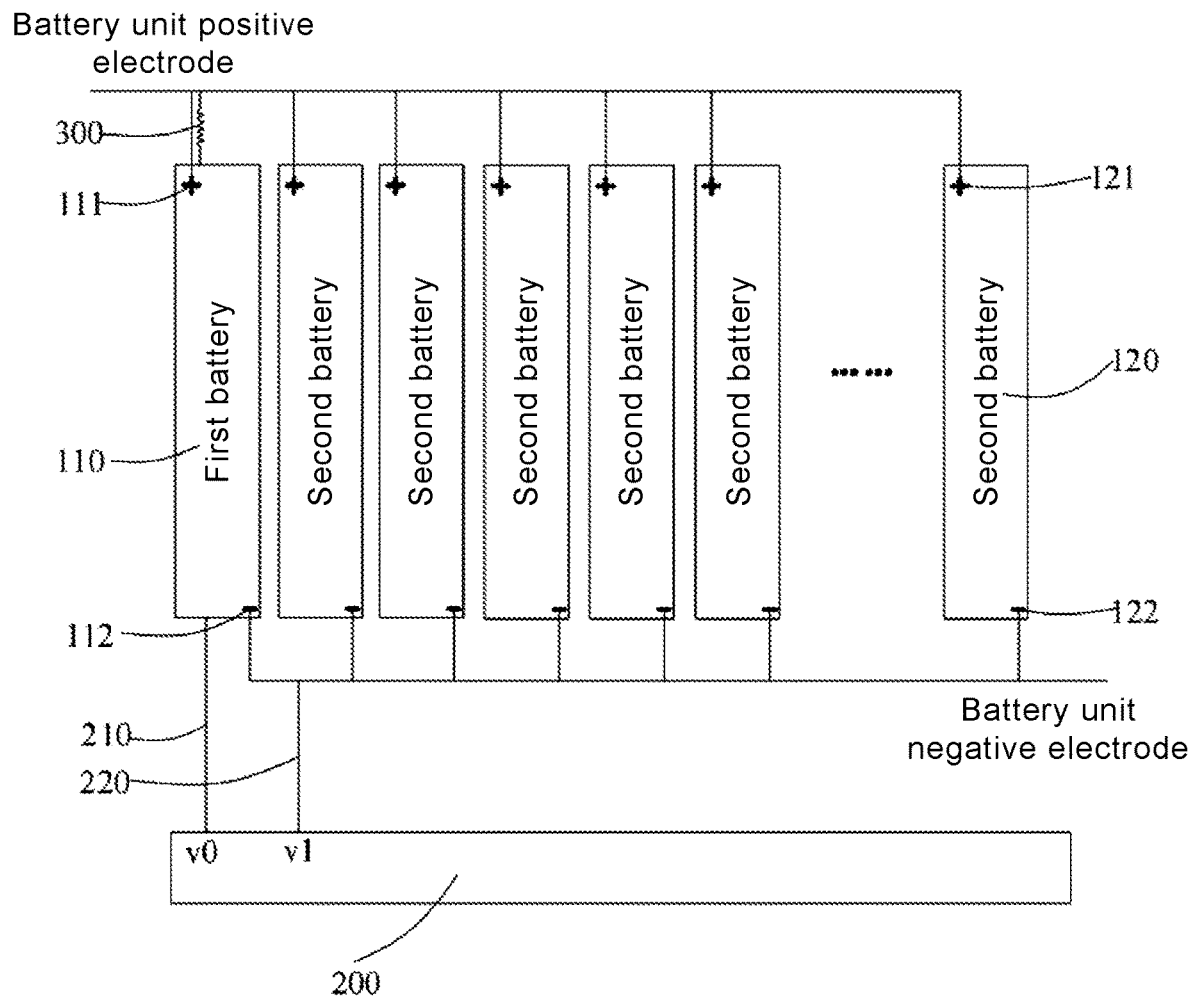
FIG. 3 is a schematic diagram of voltage collection of the battery assembly according to another exemplary embodiment of the disclosure.
Figure 4:
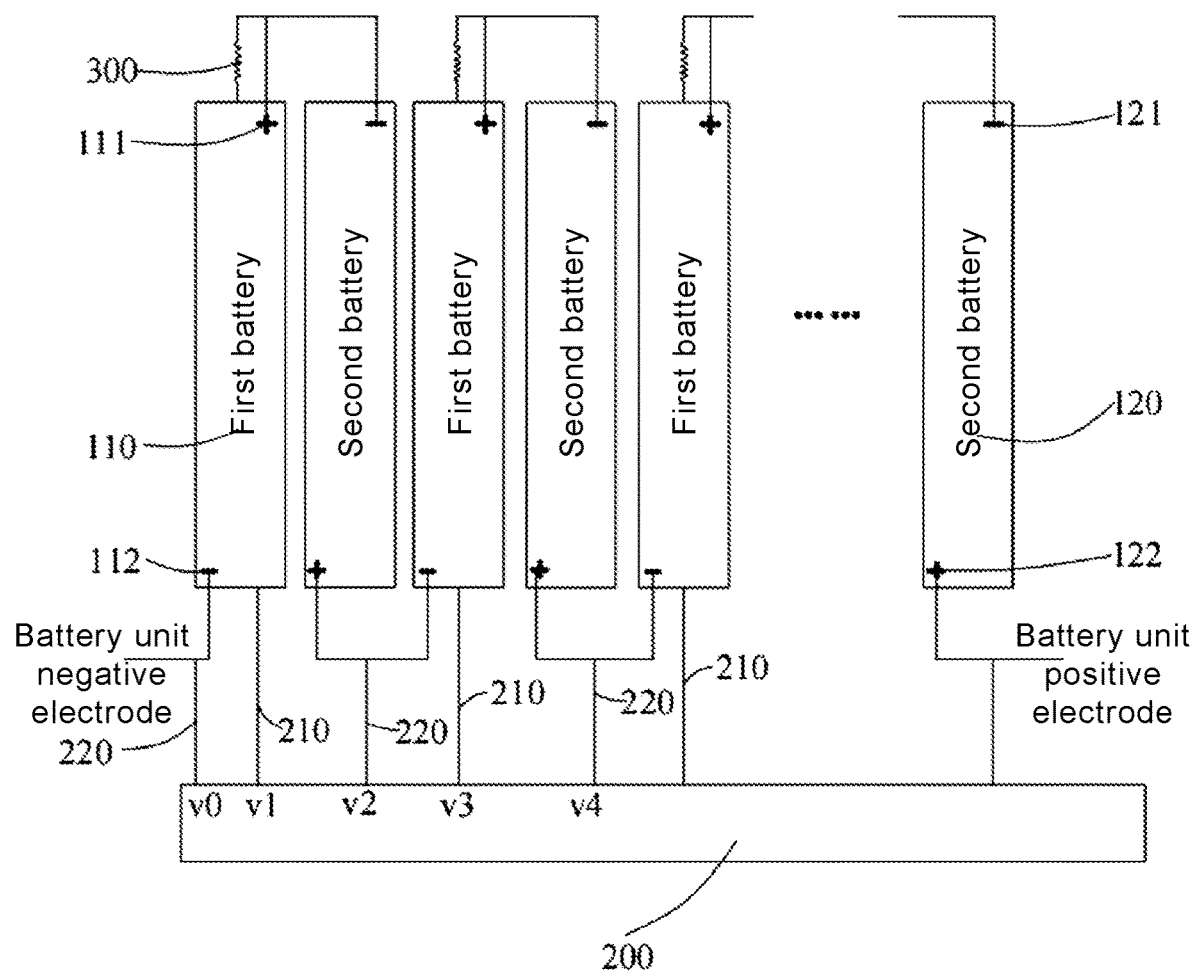
FIG. 4 is a schematic diagram of voltage collection of the battery assembly according to yet another exemplary embodiment of the disclosure.
Figure 5:
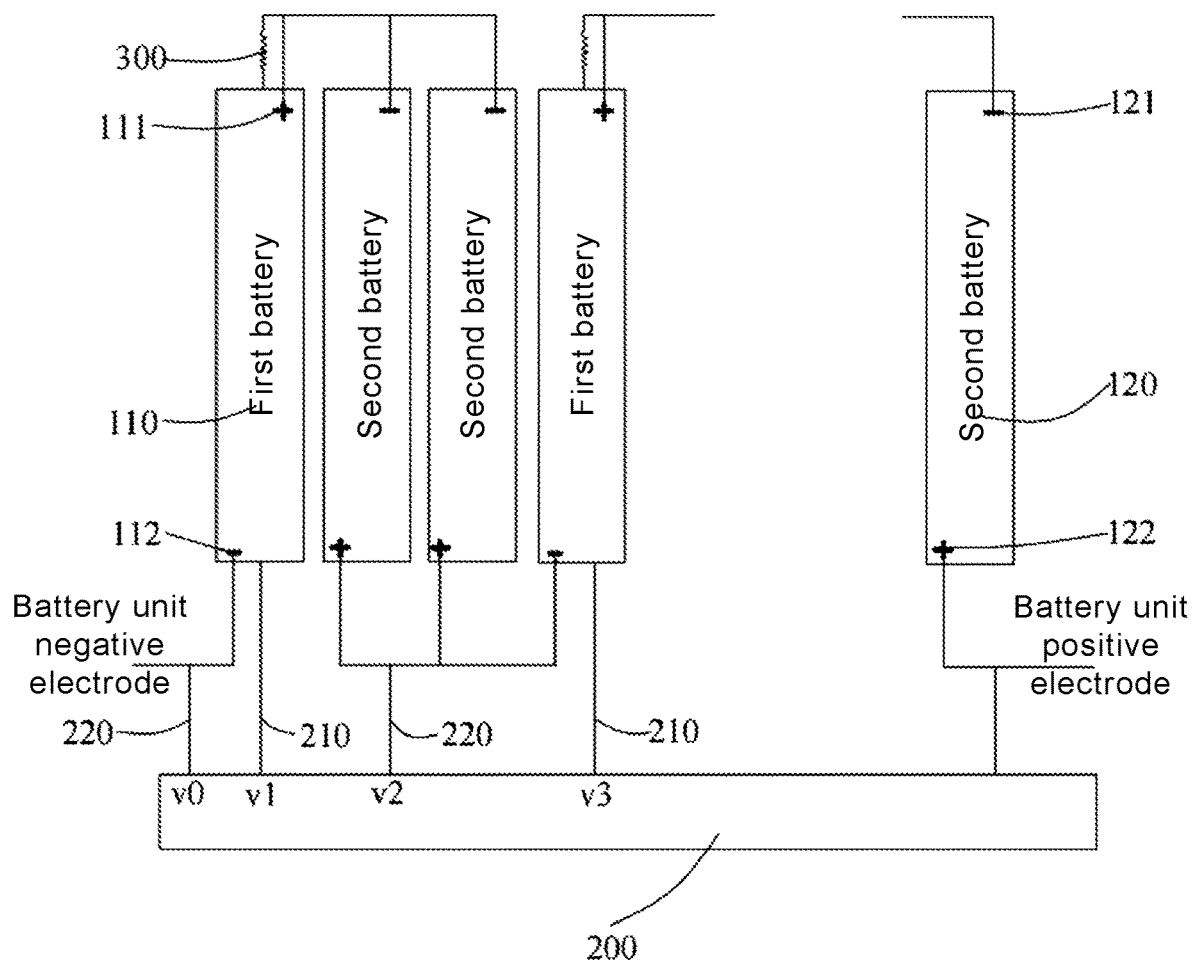
FIG. 5 is a schematic diagram of voltage collection of the battery assembly according to still another exemplary embodiment of the disclosure.

As shown in FIG. 3 to FIG. 5, in some embodiments of the disclosure, the battery column 100 also includes at least one second battery 120. The second battery 120 is electrically connected to the first battery 110. The second battery 120 being electrically connected to the first battery 110 means that the second battery 120 and the first battery 110 are connected in series or in parallel through wires or metal conductors (such as busbars). Optionally, when the second battery 120 is electrically connected to the first battery 110, a third electrode 121 is connected to the first electrode 111 with a metal conductor. In such connection, since the connection distance between the third electrode 121 and the first electrode 111 is relatively short, the connection between the two is relatively convenient.

In a specific embodiment, the second battery 120 includes the third electrode 121 and a fourth electrode 122. The distance between the third electrode 121 and the voltage collection assembly 200 is greater than the distance between the fourth electrode 122 and the voltage collection assembly 200. The second collection terminal 220 is connected to the fourth electrode 122, and is configured to collect a potential of the fourth electrode 122. For one second battery 120, one of the third electrode 121 and the fourth electrode 122 is a positive electrode and the other is a negative electrode. In this embodiment, the second collection terminal 220 of the voltage collection assembly 200 is connected to the second electrode 112 or the fourth electrode 122, and is configured to collect the potential of the second electrode 112 or the potential of the fourth electrode 122. Specifically, the second collection terminal 220 includes a plurality of second collection terminals. When the potential of the second electrode 112 requires to be collected, the second collection terminal 220 is connected to the second electrode 112. When the potential of the fourth electrode 122 requires to be collected, the second collection terminal 220 is connected to the fourth electrode 122.

As shown in FIG. 3, in an embodiment, the first battery 110 and the plurality of second batteries 120 are connected in parallel to form the battery column 100. An aluminum case battery is taken as an example. That is, the case of the first battery 110 and a case of the second battery 120 are aluminum cases formed of an aluminum material. At this time, the first electrode 111 and the third electrode 121 are each a positive electrode, and the second electrode 112 and the fourth electrode 122 are each a negative electrode. The potential of the first electrode 111 of the first battery 110 is equal to a potential of the third electrodes 121 of the second batteries 120. In addition, the potential of the second electrode 112 of the first battery 110 is equal to the potential of the fourth electrodes 122 of the second batteries 120. The positive electrode of the first battery 110 is electrically connected to the case of the first battery 110, such that the potential of the case of the first battery 110 is equal to the potential of the first electrode 111. The first collection terminal 210 of the voltage collection assembly 200 is connected to the case of the first battery 110, and the second collection terminal 220 is connected to the second electrode 112 or the fourth electrode 122. At this time, the potential of the first electrode 111 and the third electrode 121 (positive electrodes) collected by the first collection terminal 210 is v0, and the potential of the second electrode 112 and the fourth electrode 122 (negative electrodes) collected by the second collection terminal 220 is v 1. Accordingly, the voltage of the first battery 110 and the second battery 120 is v0-v1.

As shown in FIG. 4, in another embodiment, the first battery 110 and the second battery 120 are connected in series to form the battery column 100. The first battery 110 may include a plurality of first batteries and the second battery 120 may include a plurality of second batteries. The first batteries 110 and the second batteries 120 are alternately disposed. Similarly, an aluminum case battery is taken as an example. At this time, the first electrode 111 of each first battery 110 and the fourth electrode 122 of each second battery 120 are each a positive electrodes, and the second electrode 112 of each first battery 110 and the third electrode 121 of each second battery 120 are each a negative electrode. The first electrode 111 of the first battery 110 is electrically connected to the third electrode 121 of the second battery 120. The potential of the first electrode 111 of the first battery 110 is equal to the potential of the adjacent third electrode 121 of the second battery 120. The first collection terminal 210 of the voltage collection assembly 200 is connected to the case of the first battery 110, and the second collection terminal 220 is connected to the second electrode 112 or the fourth electrode 122. In the figure, taking a first one of the first batteries 110 from the left as an example, the potential of the first electrode 111 (positive electrode) of the battery collected by the first collection terminal 210 through the case is v1, and the potential of the second electrode 112 (negative electrode) of the battery collected by the second collection terminal 220 is v0. Accordingly, the voltage of the first one of the first batteries 110 is v1-v0. Taking a first one of the second batteries 120 as an example, the potential of the third electrode 121 (negative electrode) of the battery is equal to the potential of the first electrode 111 (positive electrode) of the first one of the first battery 110, and the potential specifically collected by the first collection terminal 210 is v1. The potential of the fourth electrode 122 (positive electrode) of the second battery 120 is collected by the second collection terminal 220, and the potential is specifically v2. Accordingly, the voltage of the first one of the second batteries 120 is v2-v1. By analogy, the voltages of the other batteries can be obtained.

As shown in FIG. 5, in yet another embodiment, the first battery 110 and the second battery 120 are connected in series and in parallel to form the battery column 100. In the figure, two second batteries 120 are connected in parallel and then connected in series with the first battery 110. Similarly, taking an aluminum case battery as an example, the first electrode 111 of the first battery 110 is a positive electrode, and the second electrode 112 is a negative electrode. The third electrode 121 of the second battery 120 is a negative electrode, and the fourth electrode 122 is a positive electrode. In the figure, taking a first one of the first batteries 110 from the left as an example, the potential of the first electrode 111 (positive electrode) of the first battery 110 collected by the first collection terminal 210 through the case is v1, the potential of the second electrode 112 (negative electrode) of the battery collected by the second collection terminal 220 is v0. Accordingly, the voltage of the first one of the first batteries 110 is v1-v0. Taking a first one of the second batteries 120 as an example, the potential of the third electrode 121 (negative electrode) of the battery is equal to the potential of the first electrode 111 (positive electrode) of the first one of the first batteries 110, and the potential specifically collected by the first collection terminal 210 is v1. The potential of the fourth electrode 122 (positive electrode) of the second battery 120 is collected by the second collection terminal 220, and the potential is specifically v2. Accordingly, the voltage of the first one of the second batteries 120 is v2-v1. A second one of the second batteries 120 is connected in parallel with the first one of the second batteries 120, and accordingly, the voltage of the second one of the second batteries 120 is also v2-v1. By following the abovementioned way, the voltage of the other batteries can be obtained.

In some embodiments of the disclosure, when the case of the first battery 110 is an aluminum case formed of an aluminum material, the corresponding electrode connected to the aluminum case is a positive electrode. An aluminum case is widely used in power batteries because of its low costs, light weight, and good heat dissipation. Typically, in an aluminum case battery, there exists a potential difference between the positive electrode, the case, and the negative electrode. In some cases, corrosion of the aluminum case may be caused. The lattice octahedron of the metal aluminum has an interstice size similar to that of lithium, and is thus likely to form metal interstitial compounds with lithium ions. When a negative post terminal or negative tab of the battery is in contact with the aluminum case, the potential of the aluminum case is relatively low, and the lithium ions in the electrolyte are intercalated into the aluminum case, producing lithium-intercalated aluminum compounds, and causing corrosion of the case. In the disclosure, the positive electrode of the first battery 110 is electrically connected to the aluminum case, ensuring that the aluminum case is at a relatively high potential, preventing intercalation of the lithium ions in the electrolyte into the aluminum case, and preventing corrosion of the aluminum case.

In some embodiments of the disclosure, when the case of the first battery 110 is an iron case or a copper case formed of an iron base material or a copper base material, the corresponding electrode connected to the iron case or the copper case is a negative electrode. For an iron case battery or a copper case battery, in some cases, electrochemical corrosion of the iron case or the copper may be caused case due to the relatively high potential. Therefore, in the disclosure, the negative electrode of the first battery 110 is electrically connected to the iron case or the copper case, reducing the potential of the iron case or the copper case, and preventing corrosion of the case.

Figure 6:
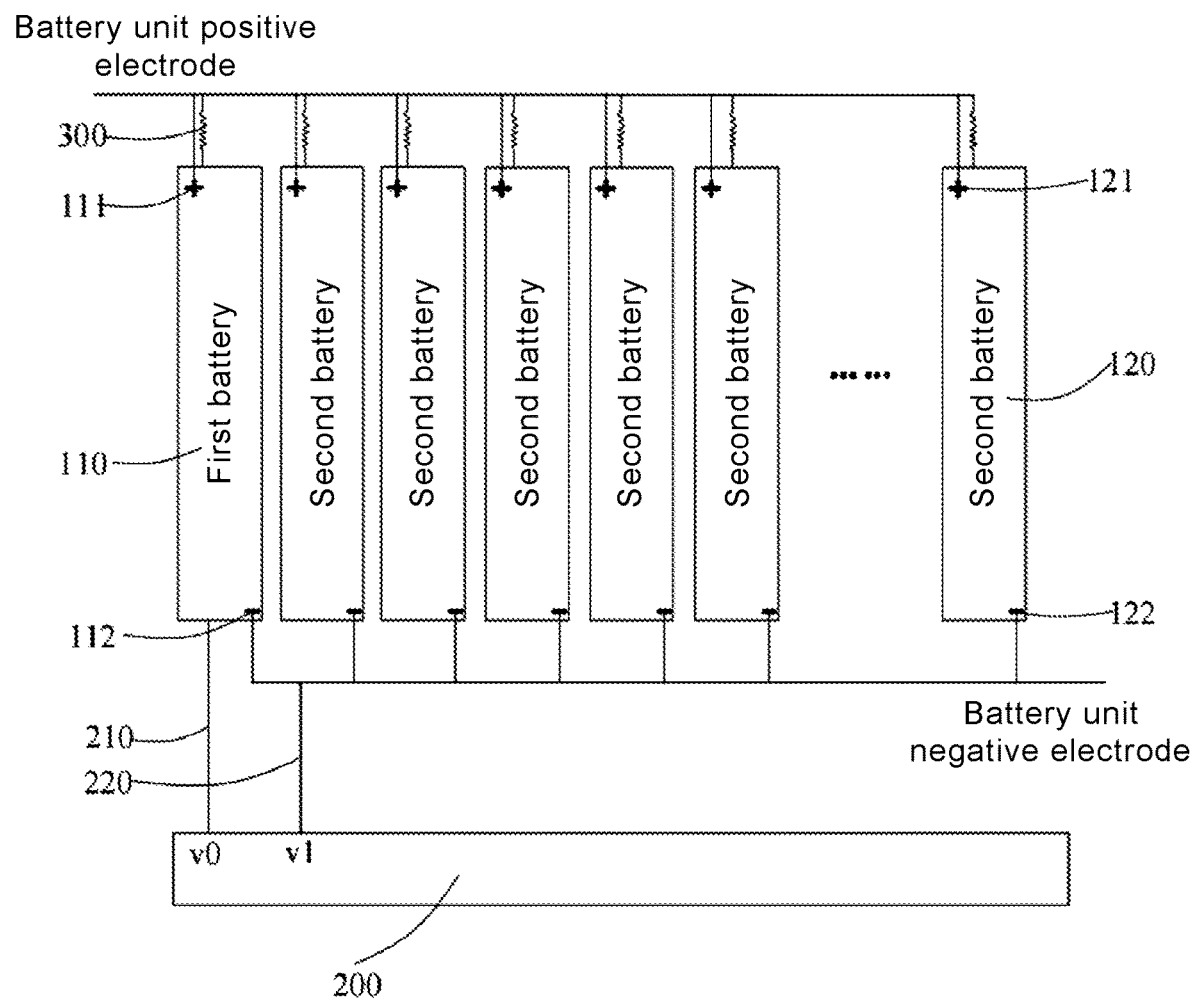
FIG. 6 is a schematic diagram of connection between a third electrode or a fourth electrode and a case according to an exemplary embodiment of the disclosure.
Figure 7:
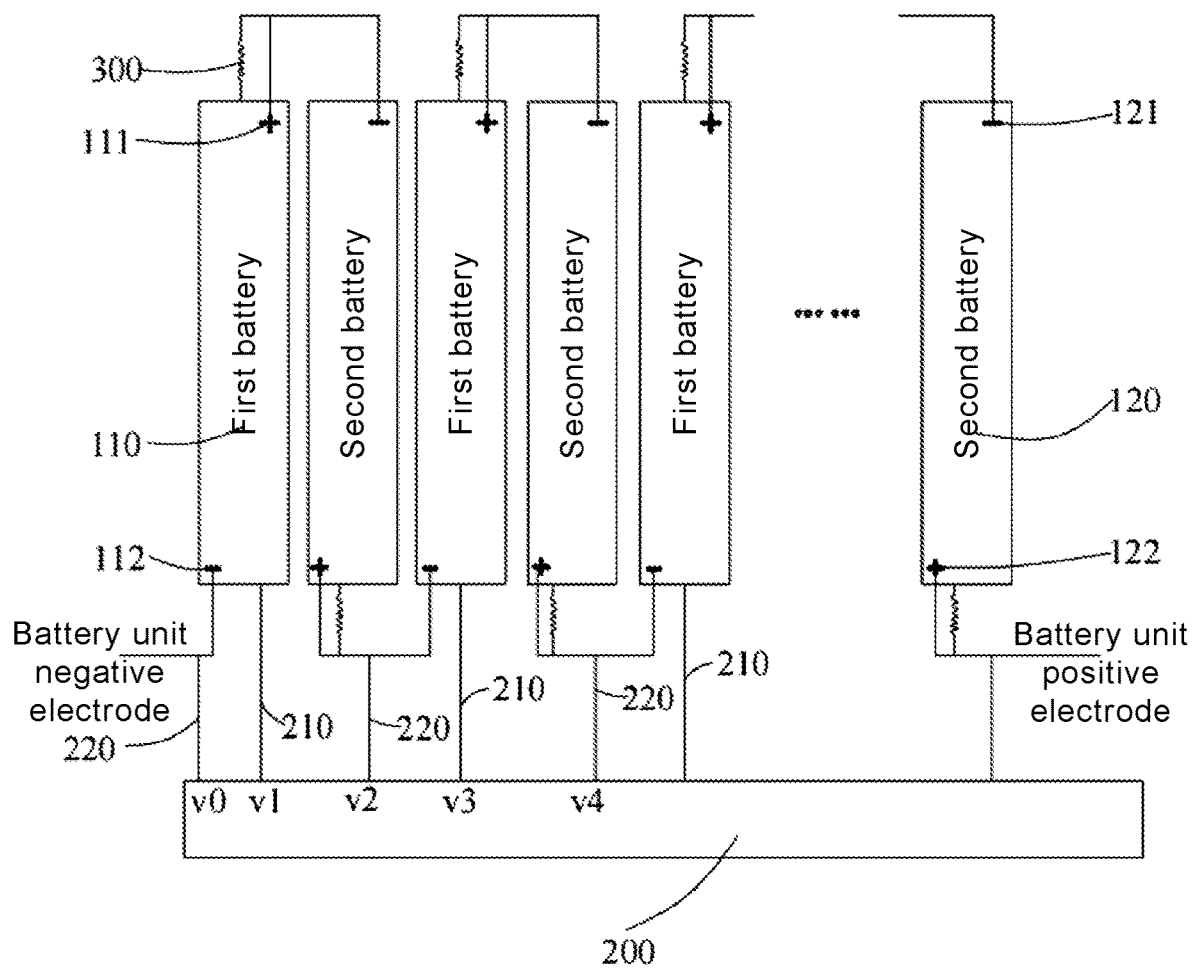
FIG. 7 is a schematic diagram of connection between a third electrode or a fourth electrode and a case according to another exemplary embodiment of the disclosure.
Figure 8:
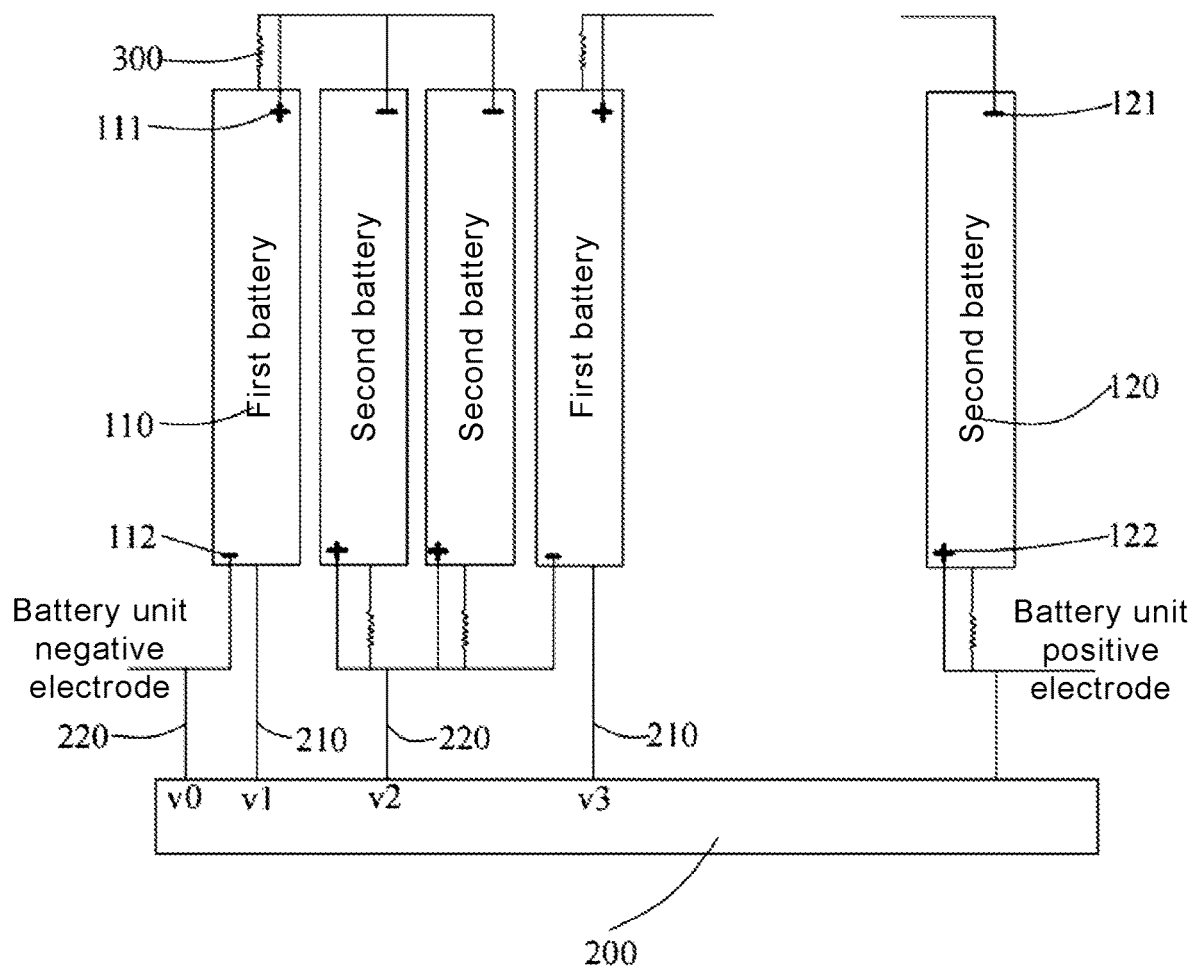
FIG. 8 is a schematic diagram of connection between a third electrode or a fourth electrode and a case according to yet another exemplary embodiment of the disclosure.

Based on the above, as shown in FIG. 6 to FIG. 8, in some embodiments, the third electrode 121 or the fourth electrode 122 of the second battery 120 is electrically connected to the case of the second battery 120 to prevent corrosion of the case of the battery. Correspondingly, when the case of the second battery 120 is an aluminum case formed of an aluminum material, the corresponding electrode connected to the aluminum case is a positive electrode. When the case of the second battery 120 is an iron case or a copper case formed of an iron base material or a copper base material, the corresponding electrode connected to the iron case or the copper case is a negative electrode.

As shown in FIG. 3 to FIG. 8, in some embodiments of the disclosure, when the electrode is electrically connected to the case of the battery, a fuse structure 300 is connected between the electrode and the case. Specifically, the fuse structure 300 is connected between the first electrode 111 of the first battery 110 and the case of the first battery 110. When the third electrode 121 of the second battery 120 is electrically connected to the case of the second battery 120, the fuse structure 300 is connected between the third electrode 121 of the second battery 120 and the case of the second battery 120. When the fourth electrode 122 of the second battery 120 is electrically connected to the case of the second battery 120, the fuse structure 300 is connected between the fourth electrode 122 of the second battery 120 and the case of the second battery 120. The fuse structure 300 serves as a protector to protect the first battery 110 and the second battery 120. When the current exceeds the specified value during a short circuit in the first battery 110 and/or the second battery 120, the fuse structure 300, with the heat generated by itself, fuses the melt and disconnects the circuit. The fuse structure 300 may be a fuse, which may be a screw fuse or a quick-acting fuse. The specific selection may be made depending on the protection property of the load and the size of the short-circuit current.

Figure 9:
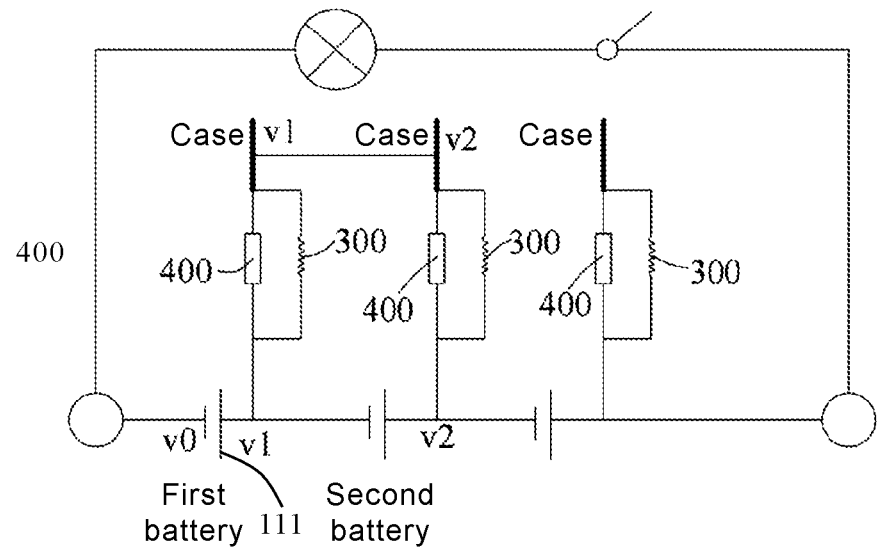
FIG. 9 is a circuit block diagram showing a resistor connected to a first battery or a second battery according to an exemplary embodiment of the disclosure.

As shown in FIG. 9, in some embodiments of the disclosure, a resistor 400 is connected between a post terminal of the first electrode 111 of the first battery 110 and the case of the first battery 110. The post terminal is connected to the case through the resistor 400. Specifically, the resistor 400 is disposed at the junction between the post terminal of the first electrode 111 and the cover plate of the first battery 110. The post terminal of the first electrode 111 and the cover plate may be electrically connected through the resistor 400. In the disclosure, since the resistor 400 is connected between the post terminal of the first electrode 111 and the case of the first battery 110, the current during a short circuit in the battery is effectively reduced and safety of the battery is improved. Taking an aluminum-lithium battery as an example, the resistor 400 is connected between the post terminal of the first electrode 111 (positive electrode) of the first battery 110 and the case of the first battery 110.

In some embodiments, the resistor 400 may be a high temperature resistant resistor, ensured to be resistant to a temperature higher than the general temperature of a battery during a safety test or a short circuit. The high temperature resistant resistor is optionally a conductive silicon carbide type high temperature resistant resistor. The silicon carbide material has a stable chemical property, a high thermal conductivity coefficient, and a low thermal expansion coefficient. In addition, silicon carbide is also a good conductive material. Silicon carbide adopted as a high temperature resistance resistor better meets the requirements of electrical conductivity and high temperature resistance. In addition, with good thermal conductivity, excess heat can be dissipated in time and safety concern caused by heat accumulation can be prevented. With a low thermal expansion coefficient and stable chemical property, it can be ensured that silicon carbide can be recycled for a long time even in abusive circumstances. Where ceramic materials such as silicon carbide (SiC) are selected, the resistance range of the high temperature resistance resistor can be expanded. In the meanwhile, the aging tendency, unstable structure, and poor long-term cycle performance of conductive plastic materials can be overcome.

In some embodiments, the resistance range of the resistor 400 may be selected based on the actual needs. The resistance range of the resistor 400 should realize the conduction between the first electrode 111 of the first battery 110 and the aluminum case, and ensure the potential consistency between the aluminum case and the first electrode 111, effectively preventing corrosion of the aluminum case. In addition, during a short circuit in the battery, it should be also ensured that large currents are not generated, sparks are prevented, and, when the current exceeds the safe current, the fuse structure 300 is melted smoothly, comprehensively ensuring the safety performance of the battery.

Similarly, to prevent corrosion of the case of the second battery 120 and ensure the safety performance of the second battery 120, when the third electrode 121 of the second battery 120 is electrically connected to the case of the second battery 120, the resistor 400 is connected between a post terminal of the third electrode 121 of the second battery 120 and the case of the second battery 120. When the fourth electrode 122 of the second battery 120 is electrically connected to the case of the second battery 120, the resistor 400 is connected between a post terminal of the fourth electrode 122 of the second battery 120 and the case of the second battery 120.

In the disclosure, the resistor 400 is connected between the case and the corresponding electrode. On the one hand, conduction between the case of the battery and the electrode is realized, and the potential consistency between the case and the electrode is ensured, effectively preventing corrosion of the case. On the other hand, the current during a short circuit in the battery is effectively reduced, and sparks are prevented, further ensuring the safety performance of the battery.

Exemplarily, as shown in FIG. 9, taking the series connection circuit of the first battery 110 with the second battery 120 as an example, where the first battery 110 and the second battery 120 are each an aluminum-lithium battery. During a short circuit in the case of the first battery 110 and the case of the second battery 120, the fuse structure 300 connected to the case of the first battery 110 is melted, while the fuse structure 300 of the second battery 120 is intact. At this time, it is equivalent to that the resistor 400 and the fuse structure 300 connected to the second battery 120 are connected in parallel, and then are connected to the resistor 400 of the first battery 110 in series on two ends of the second battery 120. The resistor 400 of the first battery 110 shares part of the current and serves for protection. The potential of the case of the second battery 120 is still equal to V2, effectively preventing corrosion of the case of the battery.

Figure 10:
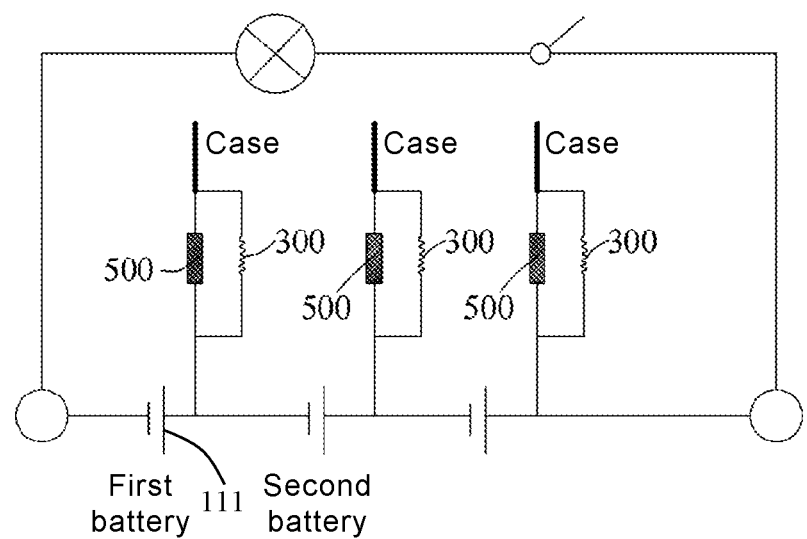
FIG. 10 is a circuit block diagram showing an insulation pad connected to the first battery or the second battery according to an exemplary embodiment of the disclosure.

As shown in FIG. 10, in some other embodiments of the disclosure, an insulation pad 500 is connected between the post terminal of the first electrode 111 of the first battery 110 and the case of the first battery 110. The post terminal is connected to the case through the insulation pad 500. Specifically, the insulation pad 500 is disposed at the junction between the post terminal of the first electrode 111 and the cover plate of the first battery 110. Taking an aluminum-lithium battery as an example, the insulation pad 500 is connected between the post terminal of the first electrode 111 (positive electrode) of the first battery 110 and the case of the first battery 110, ensuring the insulation between the positive post terminal and the case, and effectively preventing short circuit in the battery. In some embodiments, the insulation pad 500 may be a high temperature resistant insulation pad, and may be specifically formed of high temperature resistant insulating materials, such as polyimide, such that it is ensured to be resistant to a temperature higher than the general temperature of a battery during a safety test or a short circuit.

Similarly, to ensure the safety performance of the second battery 120, when the third electrode 121 of the second battery 120 is electrically connected to the case of the second battery 120, the insulation pad 500 is connected between the post terminal of the third electrode 121 of the second battery 120 and the case of the second battery 120. When the fourth electrode 122 of the second battery 120 is electrically connected to the case of the second battery 120, the insulation pad 500 is connected between the post terminal of the fourth electrode 122 of the second battery 120 and the case of the second battery 120.

Figure 11:
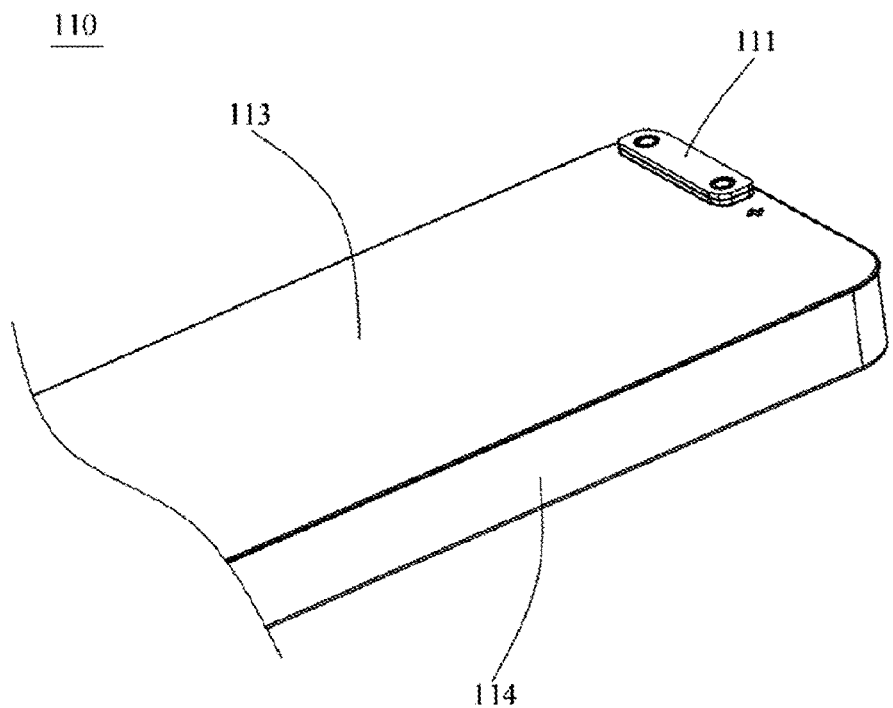
FIG. 11 is a schematic structural diagram of the first battery according to an exemplary embodiment of the disclosure.
Figure 12:
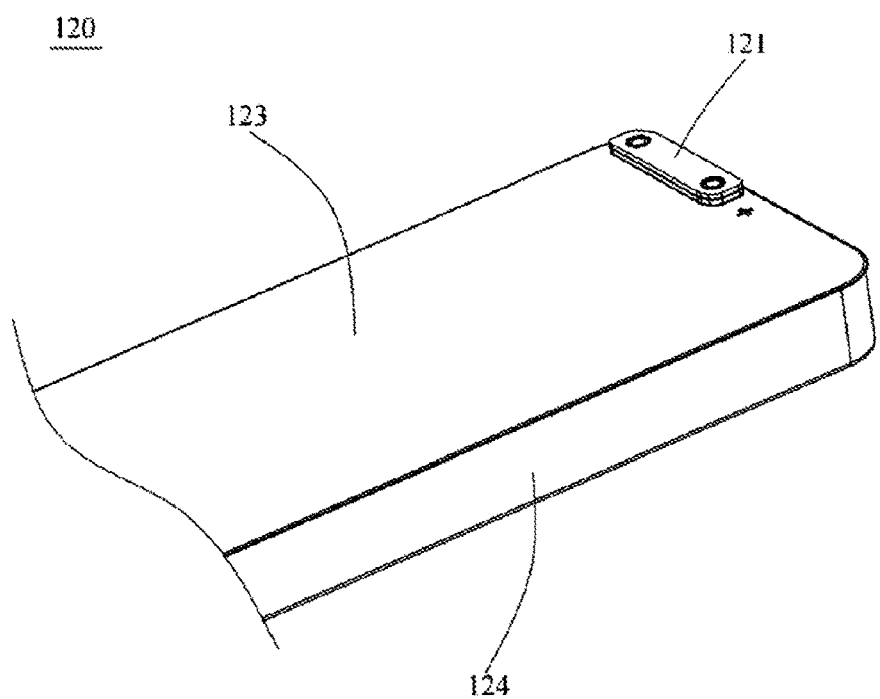
FIG. 12 is a schematic structural diagram of the second battery according to an exemplary embodiment of the disclosure.
Figure 14:
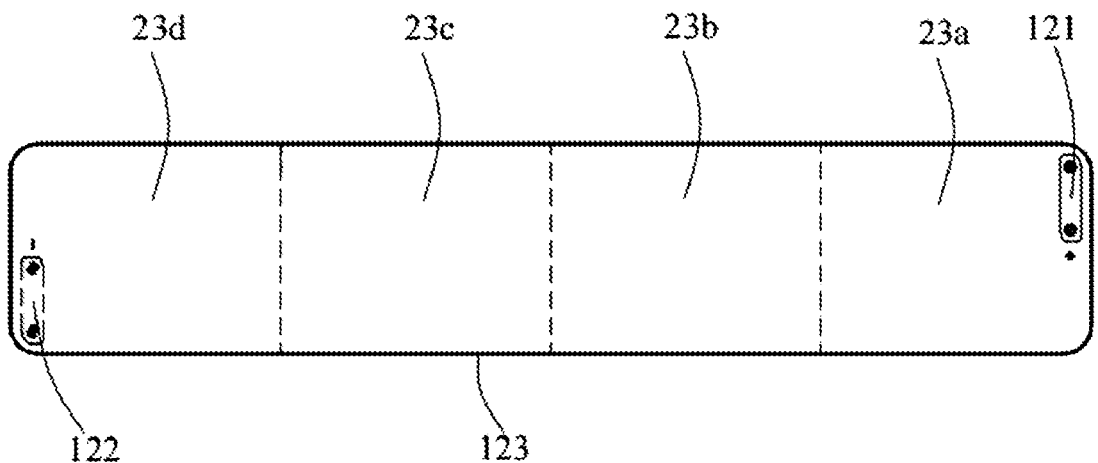
FIG. 14 is a schematic plan view of the second battery according to an exemplary embodiment of the disclosure.

As shown in FIG. 1, FIG. 11, to FIG. 14, in some embodiments of the disclosure, the first battery 110 also includes a first battery main body. The first battery main body is a portion of the first battery 110 excluding the post terminal. The first battery main body is a rectangular structure, and includes two opposite first surfaces 113 and four second surfaces 114 surrounding the first surfaces 113. The area of each first surface 113 is larger than the area of each second surface 114. The first electrode 111 and the second electrode 112 are disposed on the first surfaces 113.

In addition, the second battery 120 also includes a second battery main body. The second battery main body is a portion of the second battery 120 excluding the post terminal. The second battery main body is a rectangular structure, and includes two opposite third surfaces 123 and four fourth surfaces 124 surrounding the third surfaces 123. The area of each third surface 123 is greater than the area of each fourth surface 124. The third electrode 121 and the fourth electrode 122 are disposed on the third surfaces 123.

Herein, the first surfaces 113 are equally divided into a first region 13a, a second region 13b, a third region 13c, and a fourth region 13d sequentially arranged along a first direction. The distance between the first region 13a and the voltage collection assembly 200 is greater than the distance between the fourth region 13d and the voltage collection assembly 200. The first direction is parallel to the long side of first surfaces 113. The first electrode 111 is disposed in the first region 13a, and the second electrode 112 is disposed in the fourth region 13d.

In addition, the third surfaces 123 are equally divided into a fifth region 23a, a sixth region 23b, a seventh region 23c, and an eighth region 23d sequentially arranged along a second direction. The distance between the fifth region 23a and the voltage collection assembly 200 is greater than the distance between the eighth region 23d and the voltage collection assembly 200. The second direction is parallel to the long side of the third surfaces 123. The third electrode 121 is disposed in the fifth region 23a, and the fourth electrode 122 is disposed in the eighth region 23d.

Figure 13:
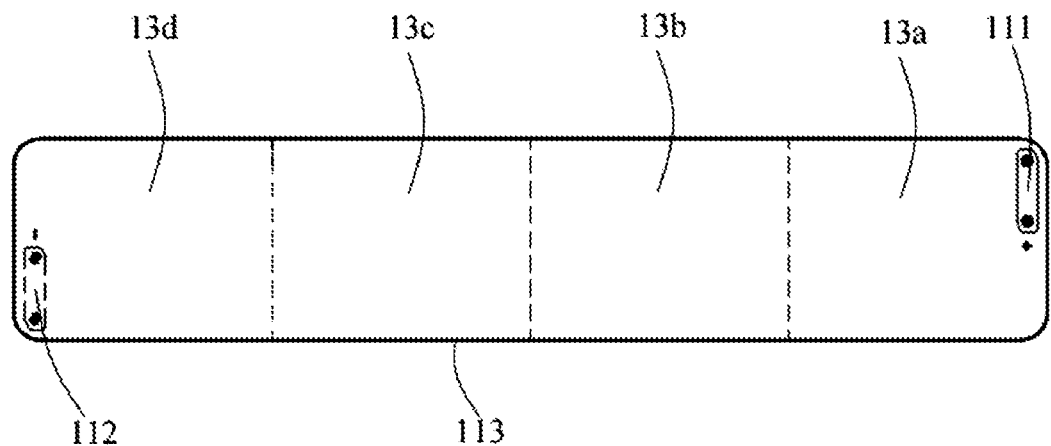
FIG. 13 is a schematic plan view of the first battery according to an exemplary embodiment of the disclosure.

As shown in FIG. 13, in an exemplary embodiment, the first electrode 111 is disposed on a corner of one of the first surfaces 113 of the first battery 110, the second electrode 112 is disposed on a corner of the other one of the first surfaces 113, and the first electrode 111 and the second electrode 112 are centrosymmetric about the center point of the first battery 110. In FIG. 13, since the second electrode 112 is disposed on the other one of the first surfaces 113, the second electrode 112 cannot be seen in the view angle as shown in FIG. 13. As such, the second electrode 112 is illustrated with a broken line.

As shown in FIG. 14, the third electrode 121 is disposed on a corner of one of the third surfaces 123 of the second battery 120, the fourth electrode 122 is disposed on a corner of the other one of the third surfaces 123, and the third electrode 121 and the fourth electrode 122 are centrosymmetric about the center point of the second battery 120. In FIG. 14, since the fourth electrode 112 is disposed on the other one of the third surfaces 123, the fourth electrode 122 cannot be seen in the view angle as shown in FIG. 14. As such, the fourth electrode 122 is illustrated with a broken line.

In like embodiments, by disposing the electrode on a corner, sufficient supporting force may be provided to the electrode, facilitating the connection and installation of the electrode, and reducing the possibility of damage to the battery.

Figure 15:
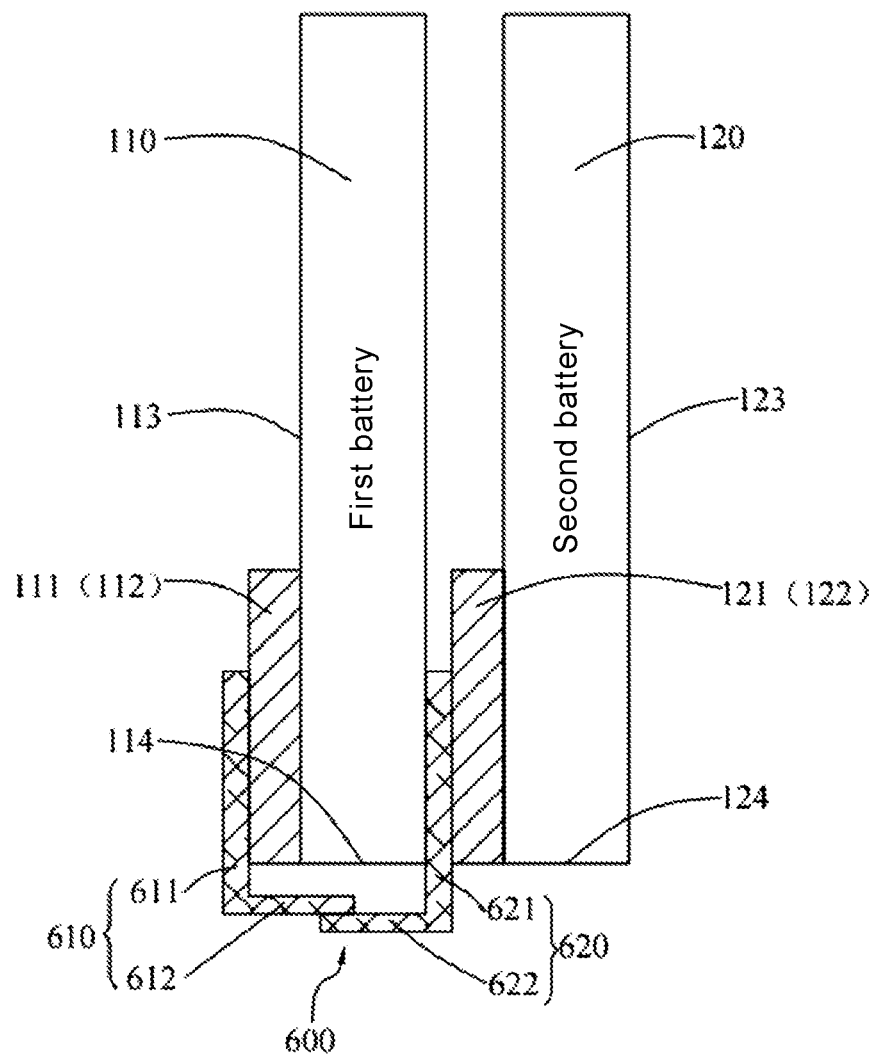
FIG. 15 is a schematic structural diagram of a busbar piece connected to a battery according to an exemplary embodiment of the disclosure.
Figure 16:
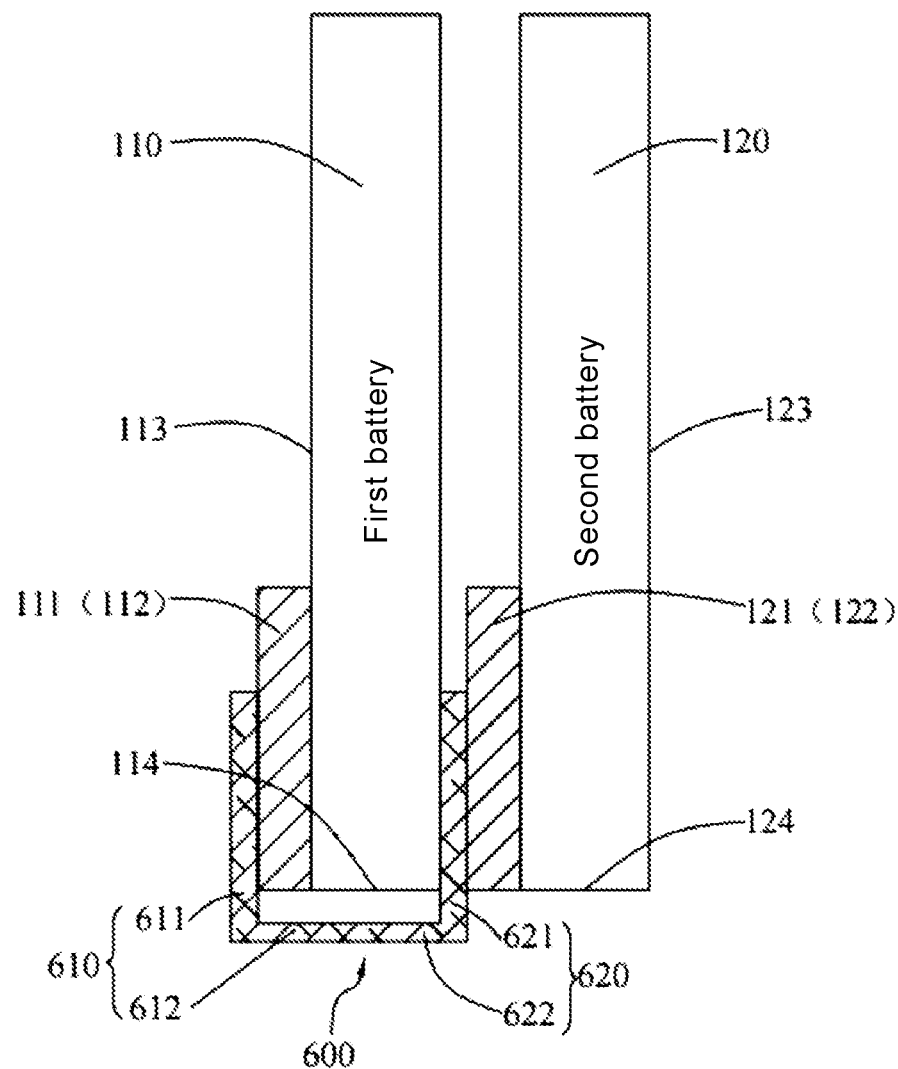
FIG. 16 is a schematic structural diagram of a busbar piece connected to a battery according to another exemplary embodiment of the disclosure.

As shown in FIG. 15 and FIG. 16, in some embodiments of the disclosure, the battery assembly also includes a busbar piece 600. The busbar piece 600 is configured to electrically connect two adjacent batteries. It should be noted that, two adjacent batteries may be two adjacent first batteries 110, two adjacent second batteries 120, or adjacent first and second batteries 110 and 120. The busbar piece 600 includes a first busbar piece 610 and a second busbar piece 620. The first busbar piece 610 is bent into a first section 611 and a second section 612, and the second busbar piece 620 is bent into a third section 621 and a fourth section 622. The first battery 110 and the second battery 120 are disposed in parallel along a direction perpendicular to the first surfaces 113. Two adjacent batteries are electrically connected through the first busbar piece 610 and the second busbar piece 620. The first section 611 is located on one side of the first surface 113 or one side of the third surface 123, the second section 612 is located outside one second surface 114 or one fourth surface 124, the third section 621 is located on one side of the first surface 113 or one side of the third surface 123, and the fourth section 622 is located outside one second surface 114 or one fourth surface 124. The first section 611 and the third section 621 are respectively configured to connect the electrodes of two adjacent batteries. The second section 612 is connected with the fourth section 622.

In some embodiments, the second section 612 is substantially parallel to one second surface 114 or one fourth surface 124, and the fourth section 622 is substantially parallel to one second surface 114 or one fourth surfaces 124. The first busbar piece 610 and the second busbar piece 620 are substantially presented in an "L" shape. The first busbar piece 610 and the second busbar piece 620 are formed of a metal conductive material to realize electrical connection of the first battery 110 and the second battery 120.

As shown in FIG. 15, in some embodiments, the first busbar piece 610 and the second busbar piece 620 are separated structures, and the second section 612 and the fourth section 622 are connected together by welding.

As shown in FIG. 16, in some other embodiments, the first busbar piece 610 and the second busbar piece 620 are integrally-formed structure, and the second section 612 and the fourth section 622 may be combined into the same section.

Figure 17:
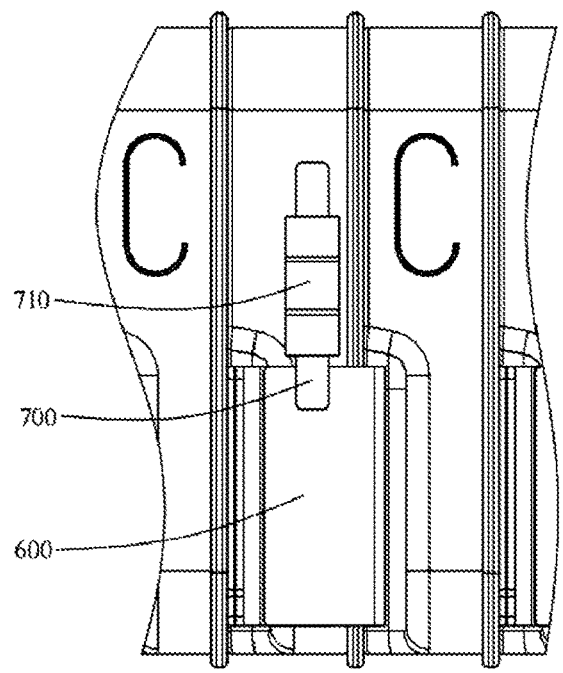
FIG. 17 is a schematic structural diagram of connection of a connecting piece according to an exemplary embodiment of the disclosure.

As shown in FIG. 17, in some embodiments of the disclosure, the battery assembly also includes a connecting piece 700. The connecting piece 700 has one end connected to the busbar piece 600 to be electrically connected to the first electrode 111 of the first battery 110, and the other end connected to the case of the first battery 110 to electrically connect the first electrode 111 of the first battery 110 to the case of the first battery 110. Alternatively, the connecting piece 700 has one end connected to the busbar piece 600 to be electrically connected to the third electrode 121 or the fourth electrode 122 of the second battery 120, and the other end connected to the case of the second battery 120 to electrically connect the third electrode 121 or the fourth electrode 122 of the second battery 120 to the case of the second battery 120. The connecting piece 700 is formed of a metal conductive material to electrically connect the case of the battery with the corresponding electrode, such that the potential of the case of the battery is equal to the potential of the corresponding electrode. In some embodiments, the fuse structure 300 is disposed in the connecting piece 700.

In some embodiments of the disclosure, an insulating member 710 is disposed on one side of the connecting piece 700 away from the battery column 100. The insulating member 710 may be an insulating layer formed of an insulating material coated on the connecting piece 700, or may be an insulating block formed of an insulating material. The insulating member 710 may be fixed on the connecting piece 700 by gluing or the like. Specifically, the insulating block may be a rubber block. In actual application, the battery assembly may be a battery module or a battery pack. The battery module includes structures such as the battery column 100, a side plate, and an end plate, and the side plate and the end plate are configured to fix the battery column 100. The battery pack includes structures such as the battery column 100 and a battery container, and the battery container is configured to fix the battery column 100. Generally, the side plate or the battery container is located on one side of the busbar piece 600, the connecting piece 700, etc. away from the battery column 100. During shaking of the battery module or the battery pack, friction may be caused between the connecting piece 700 and the side plate or the battery container, which may cause failure of the insulation between the connecting piece 700 and the side plate or the battery container. In this embodiment, the insulating member 710 is disposed on one side of the connecting piece 700 away from the battery column 100, ensuring the insulation between the connecting piece 700 and the side plate or the battery container, and ensuring the safety of the battery. In addition, when the insulating member 710 is an insulating block, the insulating block may apply certain pressure on the side plate or the battery container to increase the friction between the connecting piece 700 and the side plate or the battery container, and to improve the fixing stability of the connecting piece 700, thus the connecting piece 700 is prevented from looseness during shaking of the battery module or the battery pack.

In some embodiments of the disclosure, the first battery 110 and the second battery 120 have a length of a, where 400 mm≤a≤2500 mm; a width of b; and a height of c, where 2c≤a≤50c and/or 0.5b≤c≤20b. The first battery 110 and the second battery 120 are arranged in parallel along the width direction to form the battery column 100. The voltage collection assembly 200 is disposed on one side of the battery column 100 in the length direction.

In an exemplary embodiment, 50 mm≤c≤200 mm, and 10 mm≤b≤100 mm.

In an exemplary embodiment, 4c≤a≤25c and/or 2b≤c≤10b.

For the battery in the foregoing embodiments, in the case where sufficient energy density is ensured, the ratio between the length and the height of the battery is relatively large, and exemplarily, the ratio between the height and the width of the battery is relatively large.

In an embodiment, the first battery 110 and the second battery 120 have the length of a and the height of c, where 4c≤a≤7c. That is, in this embodiment, the ratio between the length and height of the battery is relatively large, increasing the energy density of the battery and facilitating the subsequent forming of the battery module.

In an embodiment, the first battery 110 and the second battery 120 have the width of b, where 3b≤c≤7b. The ratio between the height and the width of the battery is relatively large. In the case where sufficient energy density is ensured, the forming is also facilitated.

Optionally, for the first battery 110 and the second battery 120, the length may be 500 mm to 1500 mm, the height may be 80 mm to 150 mm, and the width may be 15 mm to 25 mm.

Figure 18:
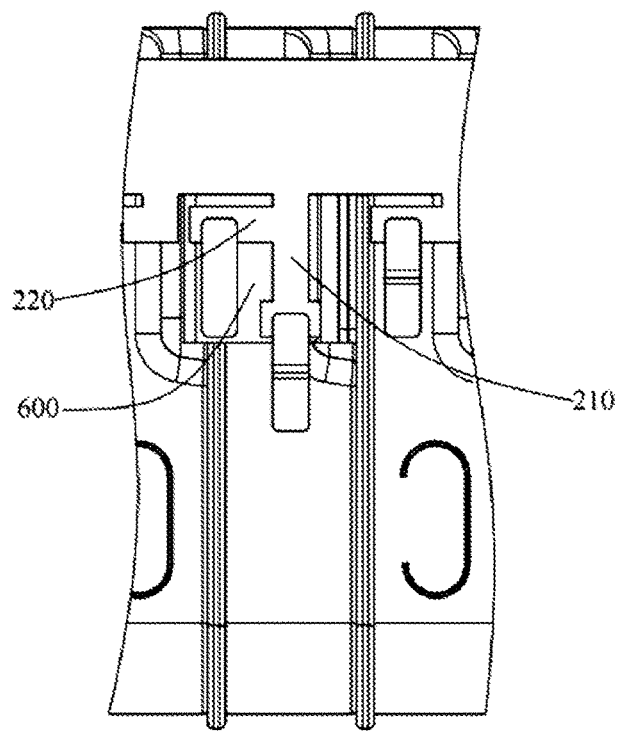
FIG. 18 is a schematic structural diagram of connection of a first collection terminal and a second collection terminal according to an exemplary embodiment of the disclosure.

As shown in FIG. 1 and FIG. 18, the voltage collection assembly 200 includes a flexible printed circuit (FPC) and a low-voltage connector. The first collection terminal 210 and the second collection terminal 220 are disposed at the flexible printed circuit. The first collection terminal 210 and the second collection terminal 220 are connected to the case or the corresponding electrode through a metal conductor to collect the potential of the case or the corresponding electrode. The flexible printed circuit extends from a side of battery column 100 toward the end portion of the battery column 100, and the extension tip is connected to the low-voltage connector. In some embodiments, for the first collection terminal 210, the potential of the case may be collected directly through the connecting piece 700, without disposing other metal conductors. The second collection terminal 220 is connected to the busbar piece 600 through a metal conductor to collect the potential of the second electrode 112 or the fourth electrode 122.

Figure 19:
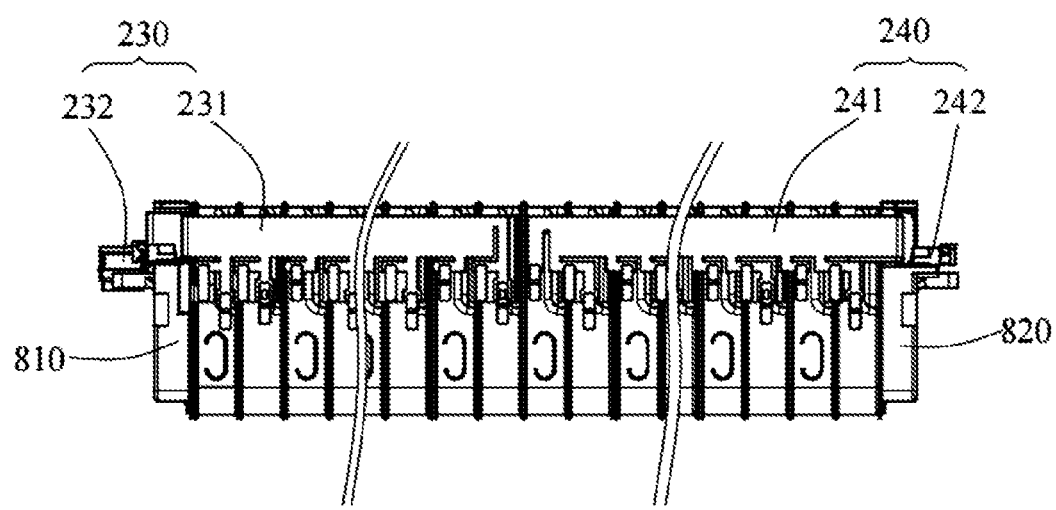
FIG. 19 is a schematic structural diagram of a first voltage collection assembly and a second voltage collection assembly according to an exemplary embodiment of the disclosure.

As shown in FIG. 1 and FIG. 19, in some embodiments of the disclosure, the battery assembly also includes a fixing frame. The fixing frame is configured to fix the voltage collection assembly 200. The fixing frame includes a first fixing frame 810 and a second fixing frame 820. The first fixing frame 810 and the second fixing frame 820 are respectively located one two ends of the battery column 100 in a battery arrangement direction. The voltage collection assembly 200 includes a first voltage collection assembly 230 and a second voltage collection assembly 240. The first voltage collection assembly 230 includes a first flexible printed circuit 231 and a first low-voltage connector 232. The first flexible printed circuit 231 is bonded to the busbar piece 600 and extends in a direction toward the first fixing frame 810. The extension tip of the first flexible printed circuit 231 is connected to the first low-voltage connector 232. The first low-voltage connector 232 is fixed on the first fixing frame 810.

In addition, the second voltage collection assembly 240 includes a second flexible printed circuit 241 and a second low-voltage connector 242. The second flexible printed circuit 241 is disposed in parallel along the arrangement direction of the first battery 110 and the second battery 120. The second flexible printed circuit 241 is bonded to the busbar piece 600 and extends in a direction toward the second fixing frame 820. The extension tip of the second flexible printed circuit 241 is connected to the second low-voltage connector 242. The second low-voltage connector 242 is fixed on the second fixing frame 820.

In actual application, as the length of the flexible printed circuit in the voltage collection assembly 200 increases, the difficulty in and the price of the molding process increase. In the disclosure, the first voltage collection assembly 230 and the second voltage collection assembly 240 are adopted to perform collection on the battery column 100 in segments, so as to reduce the length of the flexible printed circuit in the voltage collection assembly 200, and reduce the manufacturing costs of the flexible printed circuit, and improving the collection efficiency of voltage collection.

In some embodiments, the first fixing frame 810 and the second fixing frame 820 may be two end plates in the battery module. The two end plates are respectively located one two ends of the battery column 100 in the battery arrangement direction. In some other embodiments, the first fixing frame 810 and the second fixing frame 820 may be a battery container in a battery pack, and specifically may be cross beams or longitudinal beams located on two ends of the battery column 100 in the battery arrangement direction in the battery container.

The disclosure further provides a battery pack including the battery assembly according to any one of the foregoing embodiments.

The disclosure further provides a vehicle including the abovementioned battery pack.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery assembly, comprising:
   a battery column; and
   a voltage collection assembly, disposed on one side of the battery column,
   wherein the battery column comprises:
      at least one first battery, wherein the first battery comprises a first electrode and a second electrode, a distance between the first electrode and the voltage collection assembly is greater than a distance between the second electrode and the voltage collection assembly, and the first electrode of the first battery is electrically connected to a case of the first battery, such that a potential of the first electrode is equal to a potential of the case of the first battery; and
   wherein the voltage collection assembly comprises:
      a first collection terminal, wherein the first collection terminal is electrically connected to the case of the first battery, and is configured to collect the potential of the first electrode through the case of the first battery; and
      a second collection terminal, wherein the second collection terminal is connected to the second electrode, and is configured to collect a potential of the second electrode,
   wherein the battery column further comprising:
   at least one second battery, wherein the second battery is electrically connected to the first battery, the second battery comprises a third electrode and a fourth electrode, and a distance between the third electrode and the voltage collection assembly is greater than a distance between the fourth electrode and the voltage collection assembly,
   wherein the second collection terminal is connected to the fourth electrode, and is configured to collect a potential of the fourth electrode,
   the first battery further comprises a first battery main body, the first battery main body is a rectangular structure, and comprises two opposite first surfaces and four second surfaces surrounding the first surfaces, an area of each first surface is greater than an area of each second surface, and the first electrode and the second electrode are respectively disposed on the two opposite first surfaces; and
   the second battery further comprises a second battery main body, the second battery main body is a rectangular structure, and comprises two opposite third surfaces and four fourth surfaces surrounding the third surfaces, an area of each third surface is greater than an area of each fourth surface, and the third electrode and the fourth electrode are respectively disposed on the two opposite third surfaces,
   each first surface is equally divided into a first region, a second region, a third region, and a fourth region sequentially arranged along a first direction, a distance between the first region and the voltage collection assembly is greater than a distance between the fourth region and the voltage collection assembly, the first direction is parallel to a longer side of each first surface, the first electrode is disposed in the first region, and the second electrode is disposed in the fourth region; and each third surface is equally divided into a fifth region, a sixth region, a seventh region, and an eighth region sequentially arranged along a second direction, a distance between the fifth region and the voltage collection assembly is greater than a distance between the eighth region and the voltage collection assembly, the second direction is parallel to a longer side of each third surfaces, the third electrode is disposed in the fifth region, and the fourth electrode is disposed in the eighth region.

2. The battery assembly according to claim 1, wherein the third electrode or the fourth electrode of the second battery is electrically connected to a case of the second battery.

3. The battery assembly according to claim 1, wherein the case of the first battery and/or a case of the second battery is an aluminum case formed of an aluminum material, and a corresponding electrode connected to the aluminum case is a positive electrode.

4. The battery assembly according to claim 1, wherein the case of the first battery and/or a case of the second battery is an iron case formed of an iron base material or a copper case formed of a copper base material, and a corresponding electrode connected to the iron case or the copper case is a negative electrode.

5. The battery assembly according to claim 1, wherein a fuse structure is connected between the first electrode of the first battery and the case of the first battery, and located outside the case of the first battery;
when the third electrode of the second battery is electrically connected to a case of the second battery, a fuse structure is connected between the third electrode of the second battery and the case of the second battery, and located outside the case of the second battery; and
when the fourth electrode of the second battery is electrically connected to the case of the second battery, a fuse structure is connected between the fourth electrode of the second battery and the case of the second battery, and located outside the case of the second battery.

6. The battery assembly according to claim 5, wherein a resistor is connected between the first electrode of the first battery and the case of the first battery;
when the third electrode of the second battery is electrically connected to the case of the second battery, the third electrode of the second battery is connected to the case of the second battery through a resistor; and
when the fourth electrode of the second battery is electrically connected to the case of the second battery, a resistor is connected between the fourth electrode of the second battery and the case of the second battery.

7. The battery assembly according to claim 5, wherein an insulation pad is further connected between the first electrode of the first battery and the case of the first battery;
when the third electrode of the second battery is electrically connected to the case of the second battery, the third electrode of the second battery is connected to the case of the second battery through an insulation pad; and
when the fourth electrode of the second battery is electrically connected to the case of the second battery, an insulation pad is further connected between the fourth electrode of the second battery and the case of the second battery.

8. The battery assembly according to claim 2, wherein a fuse structure is connected between the first electrode of the first battery and the case of the first battery, and located outside the case of the first battery;
when the third electrode of the second battery is electrically connected to the case of the second battery, a fuse structure is connected between the third electrode of the second battery and the case of the second battery, and located outside the case of the second battery; and
when the fourth electrode of the second battery is electrically connected to the case of the second battery, a fuse structure is connected between the fourth electrode of the second battery and the case of the second battery, and located outside the case of the second battery.

9. The battery assembly according to claim 8, wherein a resistor is connected between the first electrode of the first battery and the case of the first battery;
when the third electrode of the second battery is electrically connected to the case of the second battery, a resistor is connected between the third electrode of the second battery and the case of the second battery; and
when the fourth electrode of the second battery is electrically connected to the case of the second battery, a resistor is connected between the fourth electrode of the second battery and the case of the second battery.

10. The battery assembly according to claim 8, wherein an insulation pad is further connected between the first electrode of the first battery and the case of the first battery;
when the third electrode of the second battery is electrically connected to the case of the second battery, an insulation pad is connected between the third electrode of the second battery and the case of the second battery; and
when the fourth electrode of the second battery is electrically connected to the case of the second battery, an insulation pad is further connected between the fourth electrode of the second battery and the case of the second battery.

11. The battery assembly according to claim 1, wherein the first electrode is disposed on a corner of one of the first surfaces of the first battery, the second electrode is disposed on a corner of another one of the first surfaces, and the first electrode and the second electrode are centrosymmetric about a central point of the first battery; and
the third electrode is disposed on a corner of one of the third surfaces of the second battery, the fourth electrode is disposed on a corner of another one of the third surfaces, the third electrode and the fourth electrode are centrosymmetric about a center point of the second battery.

12. The battery assembly according to claim 1, further comprising:
a busbar piece, wherein the busbar piece comprises a first piece and a second piece, the first piece is bent into a first section and a second section, and the second piece is bent into a third section and a fourth section;
wherein the first battery and the second battery are arranged in parallel in a direction perpendicular to the first surfaces, the first battery and the second battery adjacent to each other are electrically connected through the first piece and the second piece, the first section is located on one side of one of the first surfaces or one side of one of the third surfaces, the second section is located outside one of the second surfaces or one of the fourth surfaces, the third section is located on one side of one of the first surfaces or one side of one of the third surfaces, the fourth section is located outside one of the second surfaces or one of the fourth surfaces, the first section and the third section are respectively configured to connect electrodes of two adjacent batteries, and the second section is connected to the fourth section.

13. The battery assembly according to claim 12, further comprising:
a connecting piece, having one end connected to the busbar piece to be electrically connected to the first electrode of the first battery, and another end connected to the case of the first battery to electrically connect the first electrode of the first battery to the case of the first battery; or
wherein the connecting piece has one end connected to the busbar piece to be electrically connected to the third electrode or the fourth electrode of the second battery, and another end connected to a case of the second battery to electrically connect the third electrode or the fourth electrode of the second battery to the case of the second battery.

14. The battery assembly according to claim 13, wherein an insulating member is disposed on one side of the connecting piece away from the battery column.

15. The battery assembly according to claim 1, wherein a length of the first battery and a length of the second battery is a, a width of the first battery and a width of the second battery is b, and a height of the first battery and a height of the second battery is c, where $2c \leq a \leq 50c$ and/or $0.5b \leq c \leq 20b$; and where $400 \text{ mm} \leq a \leq 2500 \text{ mm}$,
wherein the first battery and the second battery are arranged in parallel along a width direction to form the battery column, and the voltage collection assembly is disposed on one side of the first battery and the second battery in a length direction.

16. The battery assembly according to claim 12, further comprising:
a fixing frame, wherein the fixing frame comprises a first fixing frame and a second fixing frame, the first fixing frame and the second fixing frame are respectively located on two ends of the battery column in a battery arrangement direction,
wherein the voltage collection assembly comprises a first voltage collection assembly and a second voltage collection assembly;
the first voltage collection assembly comprises a first flexible printed circuit and a first low-voltage connector, the first flexible printed circuit is bonded to the busbar piece and extends in a direction toward the first fixing frame, an extension tip of the first flexible printed circuit is connected to the first low-voltage connector, and the first low-voltage connector is fixed on the first fixing frame; and
the second voltage collection assembly comprises a second flexible printed circuit and a second low-voltage connector; the second flexible printed circuit is disposed in parallel along an arrangement direction of the first battery and the second battery, the second flexible printed circuit is bonded to the busbar piece and extends in a direction toward the second fixing frame, an extension tip of the second flexible printed circuit is connected to the second low-voltage connector, and the second low-voltage connector is fixed on the second fixing frame.

17. A battery pack, comprising the battery assembly according to claim 1.

18. A vehicle, comprising the battery pack according to claim 17.

* * * * *